United States Patent [19]
Huang et al.

[11] Patent Number: 6,137,251
[45] Date of Patent: Oct. 24, 2000

[54] BRUSHLESS DC MOTOR CONTROLLER WITH SPEED CONTROL FROM ZERO TO ABOVE BASED SPEED

[75] Inventors: Hao Huang; Dennis C. Nolan, both of Montivideo, Minn.

[73] Assignee: S/L Montivideo Technology, Inc., Montivideo, Minn.

[21] Appl. No.: 09/185,080

[22] Filed: Nov. 3, 1998

Related U.S. Application Data

[60] Provisional application No. 60/094,951, Jul. 31, 1998.

[51] Int. Cl.[7] ............................................. H02P 7/50
[52] U.S. Cl. ...................... 318/439; 318/138; 318/254
[58] Field of Search .................... 318/138, 245, 318/254, 439, 430, 599, 609, 610

[56] References Cited

U.S. PATENT DOCUMENTS

| | | | |
|---|---|---|---|
| 4,415,844 | 11/1983 | Mendenhall et al. | 318/254 |
| 4,447,771 | 5/1984 | Whited . | |
| 4,490,661 | 12/1984 | Brown et al. . | |
| 4,528,486 | 7/1985 | Flaig et al. | 318/254 |
| 4,546,293 | 10/1985 | Peterson et al. | 318/254 |
| 4,608,527 | 8/1986 | Glennon et al. . | |
| 4,661,750 | 4/1987 | Mori | 318/326 |
| 4,835,448 | 5/1989 | Dishner et al. . | |
| 4,962,376 | 10/1990 | Inoue et al. | 318/784 |
| 5,032,771 | 7/1991 | Kerkman et al. | 318/52 |
| 5,077,506 | 12/1991 | Krause | 318/71 |
| 5,200,675 | 4/1993 | Woo . | |
| 5,229,693 | 7/1993 | Futami et al. . | |
| 5,317,243 | 5/1994 | Cameron | 318/254 |
| 5,319,291 | 6/1994 | Ramirez | 318/254 |
| 5,386,569 | 1/1995 | Harada et al. | 393/700 |
| 5,410,234 | 4/1995 | Shibata et al. | 318/700 |
| 5,469,039 | 11/1995 | Stephenson et al. | 318/701 |
| 5,677,605 | 10/1997 | Cambier et al. . | |
| 5,859,510 | 1/1999 | Dolan et al. | 318/254 |

FOREIGN PATENT DOCUMENTS

| | | |
|---|---|---|
| 0 716 499 | 6/1996 | European Pat. Off. . |
| WO 97/50171 | 12/1997 | WIPO . |

*Primary Examiner*—David Martin
*Assistant Examiner*—Rina I. Duda
*Attorney, Agent, or Firm*—Nixon & Vanderhye P.C.

[57] ABSTRACT

A permanent magnet brushless DC motor controller, and method of operation of the controller, provide effective and smooth regulation of the speed of the motor from zero to above base speed (e.g. at least about 100% above base speed). For a three phase motor the controller comprises three Hall sensors, a power amplifier comprising a plurality of power electronic switch connected to the motor, two switches (bottom and top) for each phase, and at least an eight bit microprocessor connected to and controlling the switches, and a frequency to voltage controller. The Hall sensors are connected substantially directly to the microprocessor, and also through the frequency to voltage converter. In response to sensing by the Hall sensors, both directly and through the frequency to voltage converter, the microprocessor is used to control the electronic switches to smoothly speed regulate the motor both below and above base speed. Below base speed the microprocessor utilizes a commutation truth table, and the bottom switches provide pulse width modulation, whereas equal to and above base speed the microprocessor uses first and second jump tables, the first jump table comprising the commutation truth table forward rotated one step, and the second jump table the commutation truth table forward rotated two steps.

23 Claims, 4 Drawing Sheets

BRUSHLESS DC MOTOR CONTROLLER WITH SPEED CONTROL FROM ZERO TO ABOVE BASED SPEED

CROSS-REFERENCE TO RELATED APPLICATIONS

This application is based on Provisional Application No. 60/094,951 filed Jul. 31, 1998.

BACKGROUND AND SUMMARY OF THE INVENTION

The six step brushless DC permanent magnet motor (typically controlled by a controller acting according to a commutation truth table) is known as the type of motor which has the highest torque and power density capabilities. Therefore, this motor is becoming increasingly popular in industrial drive applications. However, because of the natural characteristic of the permanent magnets, the magnetic field in the air gap of the motor is constant. The maximum speed of the motor is limited by the supply voltage from its power source (such as a group of batteries, a power supply, or a generator). In other words, when the back EMF of the motor approaches the supply voltage for the motor controller, the controller is not able to maintain or increase motor currents so as to raise the motor speed. This maximum speed is called "base speed". This characteristic results in two problems. The first is that the maximum operating speed of the motor is capped by the supply voltage. The second is that the speed range of the brushless DC motor is limited. To increase the speed range, one has to reduce the voltage sensitivity of the motor so that the back EMF of the motor will match the supply voltage at higher speed. It is well known by the brushless DC motor industry that the torque sensitivity is proportional to the voltage sensitivity. Lower values of the voltage sensitivity result in higher motor currents. Therefore, one has to increase the capacity of power electronic devices, such as MOSFETs or IGBTs, in the motor controller, to overcome these problems. The cost and size of the motor increase correspondingly. These penalties have restricted expanded use of brushless DC motors in the industrial drive business.

The primary motivation for the present invention is to solve the above mentioned problems, i.e., to widen the motor speed range without cost and size penalties. The invention provides a reliable method for closing the motor speed loop within the motor's entire speed range, i.e., from zero speed to speeds far above (e.g. even 200–300% above, e.g. at least about 100% above) the base speed for any surface mounted brushless DC motor with two or more winding phases, with a set of normal Hall position sensors for commutation (which are conventionally used in brushless DC motors). The term "surface mounted" means that the magnets are placed on the surface of the motor rotor.

In attempting to solve these problems previous efforts have focused on sine current wave form brushless permanent magnet motors with three current sensors plus much more sophisticated commutation means, such as resolvers or encoders. Representative U.S. patents illustrating this are U.S. Pat. Nos. 4,490,661 and 4,447,771. The brushless permanent magnet motor with sine current wave form is normally classified as an AC synchronous brushless motor, which is mostly used in servo applications where precision is generally required and efficiency of the motor is not important. The sine current wave form drive has more switching losses than those of the brushless DC motor drive. The current wave form of a brushless DC motor is rectangular. The present invention is for a brushless DC motor.

Further, in U.S. Pat. No. 4,834,448 the control switches from a start circuit to a run circuit at a pre-selected speed. In U.S. Pat. No. 5,677,605, a phase advancement for constant power operation above base speed is proposed for a brushless DC motor with Hall sensors as commutation means. However, closed loop speed control for speeds above base speed is not provided.

The unique approach of the present invention is to forward rotate the commutation truth table one or two steps when the motor is required to operate at above base speed. A PI [proportional integration] speed regulator is utilized to generate a signal to determine the time gap between the edge of the most recently triggered Hall sensor and the time to switch to the next step of the above base speed commutation truth table.

According to one aspect of the present invention a method of operating a brushless permanent magnet DC motor having a plurality of Hall sensors for commutation of the motor, a base speed, and an applicable commutation truth table, using at least one jump table based upon the applicable commutation truth table, is provided. The method comprises: (a) Up to base speed operation, effecting commutation of the motor using the applicable commutation truth table triggered by the Hall sensors, with pulse width modulation switching. (b) Above base speed operation, automatically determining a proper time delay between the edge of the most recently triggered Hall sensor and the time to switch to the next commutation step. And (c) automatically regulating motor speed above base speed, utilizing the time delay from (b), and without pulse width modulation switching, by using the at least one jump table.

Preferably (c) is practiced using a PI regulator, and adjusting the proportional gain and integral gain of the PI regulator. Typically, the time delay determined in (b) is TD, and the PI regulator outputs a variable PIOHP, and one sixth of a Hall sensor period is Thall; under these circumstances (b) is practiced to determine TD pursuant to the following equations: when PIOHP is less than AA, TD=1.5*Thall*(AA−PIOHP)/FF; and when PIOHP is equal to or greater than AA, TD=1.5*Thall*[AA/2+FF−PIOH]/FF, AA is equal to ⅔ of FF and FF is the maximum number which can be stored in a signal data memory of a microprocessor. For an 8 bit process, AA=$AA and FF=$FF. Typically, the at least one jump table comprises first or second jump tables, the first jump table comprising the applicable commutation truth table forward rotated one step (60 electrical degrees), and the second jump table comprising the applicable commutation truth table forward rotated two steps; and wherein the PI regulator outputs a variable PIOHP; and wherein (c) is practiced by using the first jump table when PIOHP is less than $AA, and the second jump table when PIOHP is substantially equal to or greater than $AA.

Also, (b) and (c) are practiced so that the time delay for the first jump table gives a synchronous torque angle for about 0–60 degrees, and so that the time delay for the second jump table gives a substantially synchronous torque angle for about 60–85 degrees, and so that the maximum torque angle is limited to about 85 degrees. In the preferred embodiment (b) and (c) are practiced using an at least eight bit microprocessor, and wherein the tables are provided in software in the microprocessor.

According to another aspect of the present invention a controller assembly for a permanent magnet brushless DC motor having a plurality of phases is provided. The controller assembly comprises the following components comprising: A plurality of Hall sensors comprising commutation position sensors for the permanent magnet brushless DC motor. A power amplifier comprising a plurality of power electronic switches connected to the motor, two power electronic switches connected to each phase of the motor. An at least 8-bit microprocessor connected to and controlling each of the power electronic switches. A frequency to voltage converter. The Hall sensors connected substantially directly to the microprocessor, and also connected to the frequency to voltage converter, which in turn is connected to the microprocessor. And wherein the microprocessor, in response to sensing by the Hall sensors both directly and through the frequency to voltage converter, controls the electronic switches to smoothly speed regulate the motor both below and above base speed.

The controller assembly also preferably further comprises a current sensor connected to the microprocessor, and the microprocessor preferably comprises a torque regulator for below base speed operation, and speed regulator and time delay for above based speed operation.

Preferably the electronic switches associated with each phase comprise a top switch and a bottom switch with pulse width modulation (PWM) below base speed, and the microprocessor further comprises a commutation truth table for below base speed operation which, for a three phase motor, comprises:

| Hall C | Hall B | Hall A | Gating |
|--------|--------|--------|--------|
| 0 | 0 | 1 | A top on and B bottom PWM |
| 0 | 1 | 0 | B top on and C bottom PWM |
| 0 | 1 | 1 | A top on and C bottom PWM |
| 1 | 0 | 0 | C top on and A bottom PWM |
| 1 | 0 | 1 | C top on and B bottom PWM |
| 1 | 1 | 0 | B top on and A bottom PWM |

The microprocessor preferably further comprises, for substantially equal to and above base speed operation, first and second jump tables, the first jump table comprising the commutation truth table forward rotated one step, and the second jump table comprising the commutation truth table forward rotated two steps. The first jump table controls the time delay to provide a substantially synchronous torque for about 0–60 degrees, and the second jump table controls the time delay to provide a substantially synchronous torque for about 60–85 degrees.

In the preferred embodiment the motor comprises a three phase motor, and the plurality of Hall sensor comprise three Hall sensors.

According to another aspect of the present invention a method of controlling a permanent magnet brushless DC motor, having a controller as described above, is provided, the method comprises: (a) in response to sensing by the Hall sensors both directly and through the frequency to voltage converter, using the microprocessor to control the electronic switches to smoothly speed regulate the motor both below and above base speed. Also, preferably (a) is further practiced by sensing the current, and by below base speed operating the microprocessor, using the sensed current, to control the torque of the motor. Still further, (a) is practiced by below base speed pulse width modulating the bottom switches with a power amplifier, and using the commutation truth table which, for a three-phase motor, is as described above. Also, (a) is further practiced for substantially equal to and above base speed operation by the microprocessor using first and second jump tables, the first jump table comprising the commutation truth table forward rotated one step, and the second jump table comprising the commutation truth table forward rotated two steps.

It is the primary object of the present invention to provide a brushless permanent magnet DC motor controller, and method of operation of the DC motor, which closes the motor speed loop within the motors entire speed range (from zero speed to speeds far above base speed) without significantly increasing the cost and size of the motor. This and other objects of the invention will become clear from an inspection of the detailed description of the invention and from the appended claims.

DETAILED DESCRIPTION OF THE DRAWINGS

Figure 1:
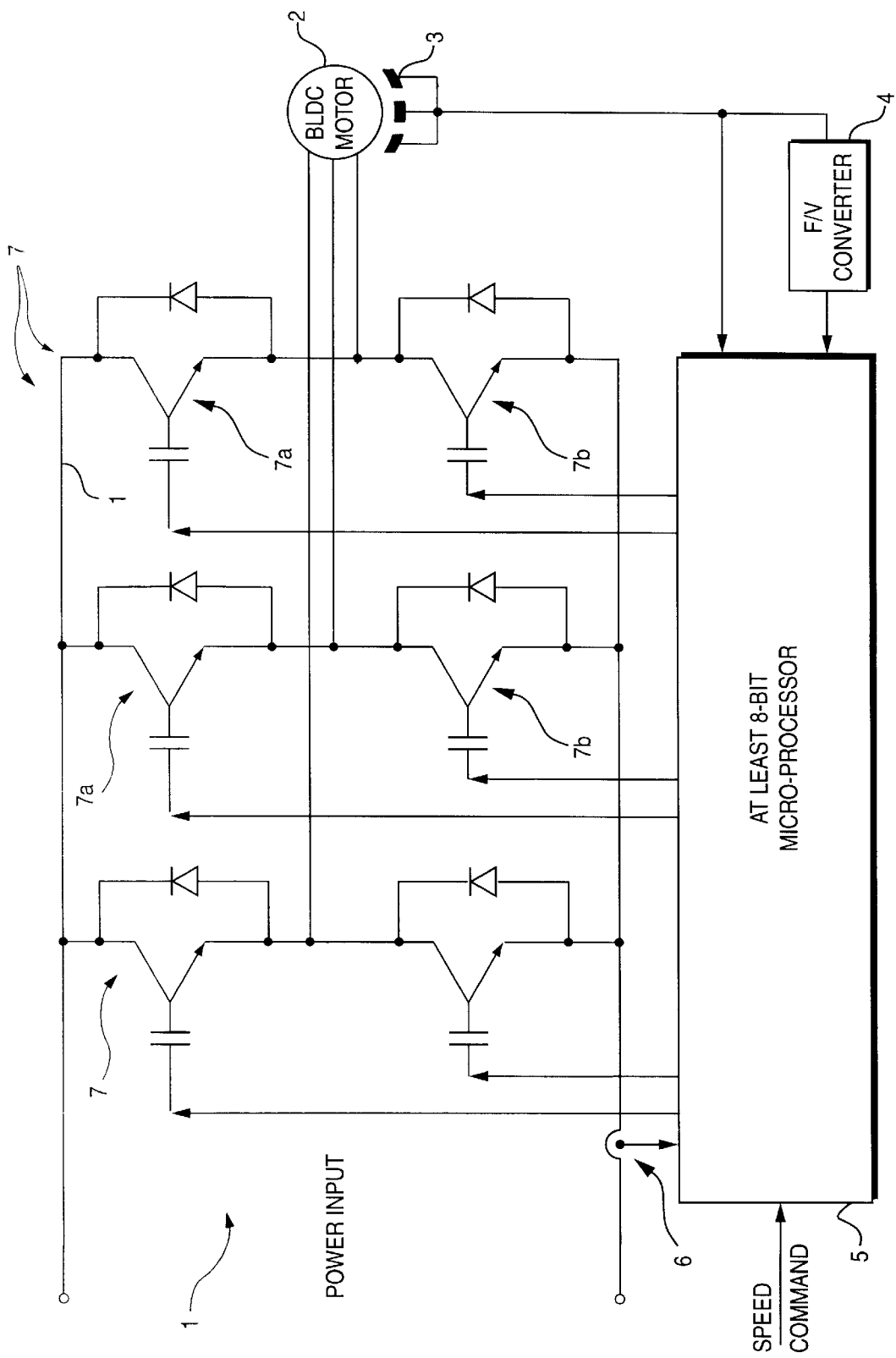
FIG. 1 is a schematic view of an exemplary motor controller assembly according to the present invention associated with a schematically illustrated brushless permanent magnet DC motor.

FIG. 1 schematically illustrates the hardware utilized for the motor controller assembly according to the invention. Element 1 is a power amplifier, which comprises or consists of four, six, or more power electronics switches 7, such as IGBTs or MOSFETs. The number of the electronic switches 7 used depends upon the number of phases of the motor 2. Each phase has two switches 7, a top switch 7a and a bottom switch 7b (see FIG. 1). The two switches 7 for each phase are connected in series and the join point is also connected to the corresponding phase of the motor 2. The top switch 7a is connected to a positive bus and the bottom switch 7b is connected to the negative bus through a current sensor 6 as illustrated in FIG. 1. The gates of the switches 7 are controlled by microprocessor 5. The number of bits of the microprocessor 5 can be as small as eight.

The brushless permanent magnet DC motor 2 has conventional Hall sensors (one for each phase) 3 mounted on its end cap. The Hall sensors 3 are commutation position sensors, which are triggered by a permanent magnet located on the rotor of motor 2. A conventional frequency to voltage converter (F/V converter) 4 converts the Hall signals to voltage signals that represent the motor 2 speed. The current sensor 6 is for motor 2 torque regulation. When the motor 2 operates below the base speed (i.e., a speed at which the back EMF of the motor matches the supply voltage), there are no significant differences between the controller of the invention and a conventional microprocessor controller.

There are two regulation loops in the microprocessor 5 software according to the invention: a speed loop and a torque loop. The torque loop is closed by the current sensor 6. The speed loop is closed by the F/V converter 4 which receives input signals Hall sensors 3. The microprocessor 5 sends pulse width modulation (PWM) signals to the gates of switches 7 to control the motor 2 to a desired speed.

Figure 2:
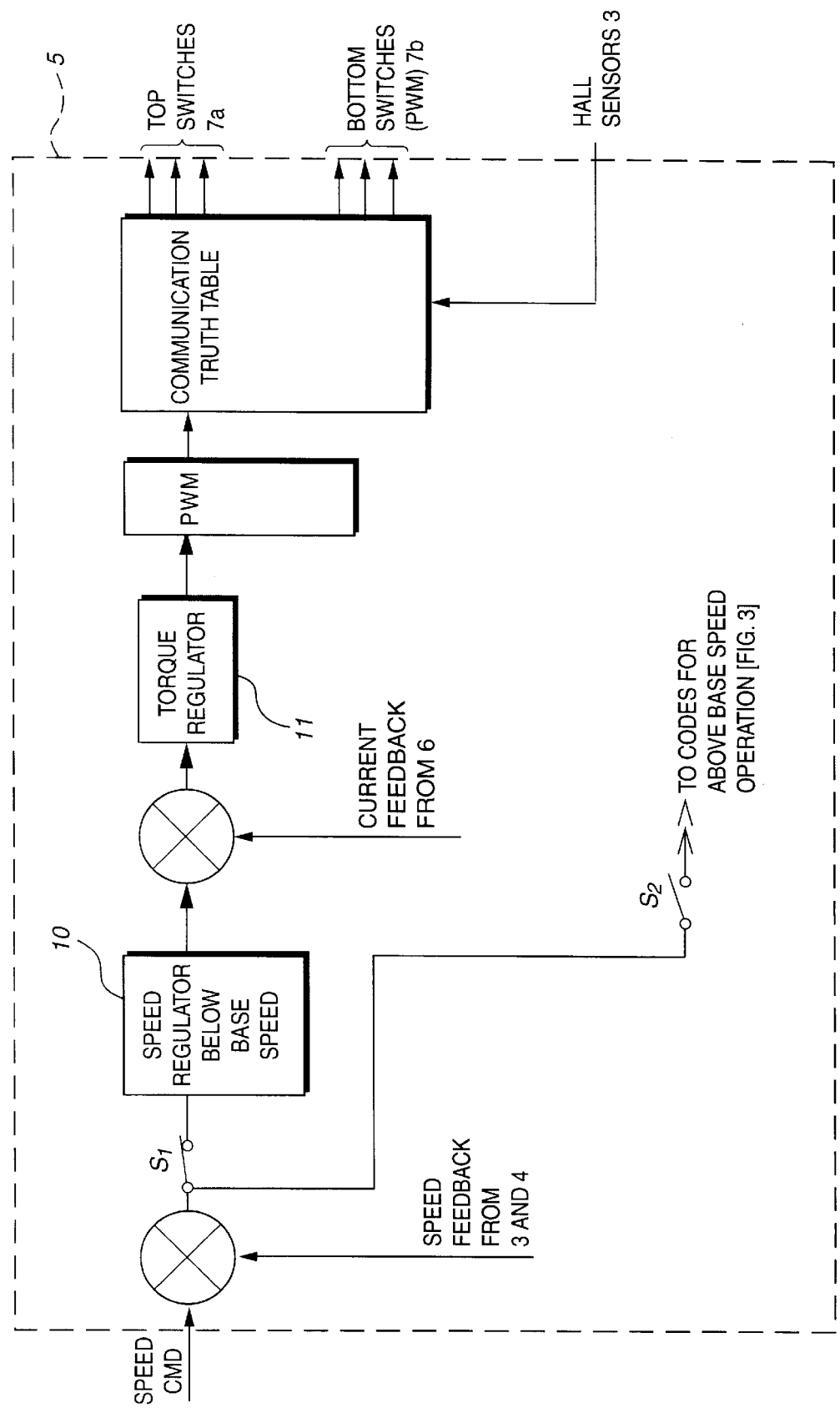
FIG. 2 is a schematic representation of a part of the internal workings of the microprocessor of FIG. 1 for below base speed operation.

An exemplary control mechanism for below base speed operation is illustrated in FIG 2. During operation numerical switch S1 in the microprocessor software is closed. There are two regulators in the software: a speed regulator 10 and a torque regulator 11. The output of the speed loop 10 is the input command of the torque loop 1, and the output of the torque loop 11 is the PWM duty cycle. The power amplifier 1 of the invention has PWM on its bottom switches 7b. A commutation truth table which is based on a conventional commutation truth table in the software of the microprocessor 5 is executed to logically control gating of the power amplifier. The commutation truth table for a three phase motor (2) is as follows:

Commutation Truth Table

| Hall C | Hall B | Hall A | Gating |
|---|---|---|---|
| 0 | 0 | 1 | A top (switch 7a) on and B bottom (switch 7b) PWM |
| 0 | 1 | 0 | B top on and C bottom PWM |
| 0 | 1 | 1 | A top on and C bottom PWM |
| 1 | 0 | 0 | C top on and A bottom PWM |
| 1 | 0 | 1 | C top on and B bottom PWM |
| 1 | 1 | 0 | B top on and A bottom PWM |

Figure 3:
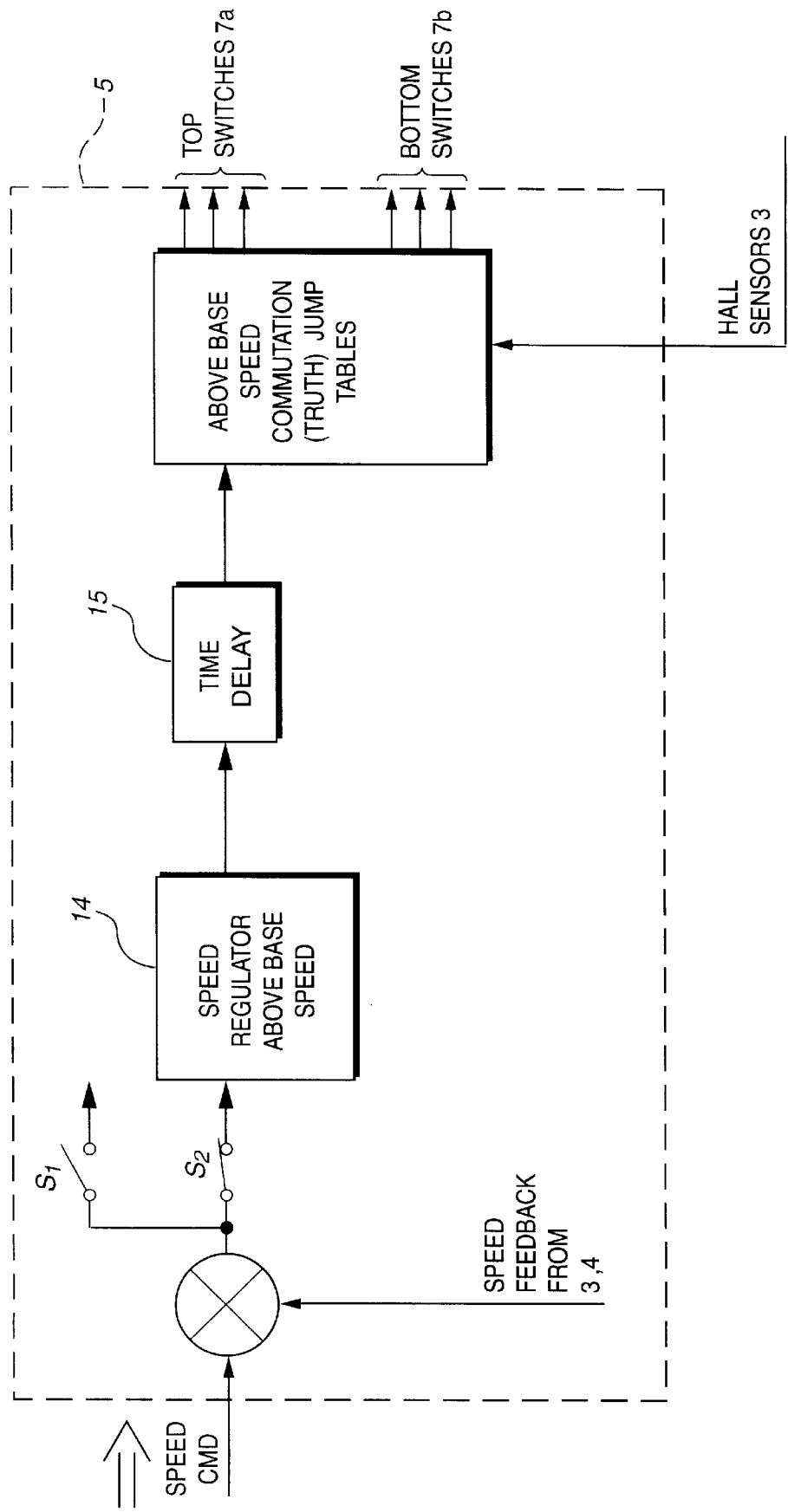
FIG. 3 is a view like that of FIG. 2 only for substantially equal to or above base speed operation.

During the above base speed operation, numerical switch S1 is open and the numerical switch S2 is closed so that the portion of the software for the above base speed operation is in service. The speed feedback is the same as that during the below base speed operation. The Hall sensor 3 inputs are the same as those during the below base speed operation as well. When the motor 2 speed is above the base speed, the PWM duty cycle will be 100%, so that no PWM switching will occur. The control mechanism comprises or consists of three components in the software of the microprocessor 5 as schematically illustrated in FIG. 3: The PI speed regulator 14, the time delay mechanism 15, and two above speed jump tables which are based on the below base speed commutation truth table. The first jump table is obtained from the normal commutation truth table (above) by forward rotating one step, while the second jump table is obtained from the commutation truth table by forward rotating two steps. The jump tables are:

| Hall C | Hall B | Hall A | Gating |
|---|---|---|---|
| First Jump (Truth) Table | | | |
| 0 | 0 | 1 | A top on and C bottom on |
| 0 | 1 | 0 | B top on and A bottom on |
| 0 | 1 | 1 | B top on and C bottom on |
| 1 | 0 | 0 | C top on and B bottom on |
| 1 | 0 | 1 | A top on and B bottom on |
| 1 | 1 | 0 | C top on and A bottom on |
| Second Jump (Truth) Table | | | |
| 0 | 0 | 1 | B top on and C bottom on |
| 0 | 1 | 0 | C top on and A bottom on |
| 0 | 1 | 1 | B top on and A bottom on |
| 1 | 0 | 0 | A top on and B bottom on |
| 1 | 0 | 1 | A top on and C bottom on |
| 1 | 1 | 0 | C top on and B bottom on |

The key to regulating the motor speed during above base speed operation according to the invention is to determine a proper time delay between the edge of the most recently triggered Hall sensor 3 and the time to switch to the next commutation step. This invention presents a method to do that automatically and without knowing the parameters of the motor 2 except the voltage sensitivity of the motor 2.

Assuming an eight bit microprocessor 5, the PI regulator 14 is used. PIOHP is the output of the PI regulator in the microprocessor 5 software.

$$PIOHP = K_p e(n) + \sum_i^n K_I Te(i),$$

where Kp and $K_I$ are proportional gain and integral gain respectively; T is sampling period; and e is "error", which is equal to difference between speed command and measured speed. Consequently, one sixth of the period of the Hall sensor 3 is calculated from the measured motor speed (from F/V converter 4), Thall. The time delay, TD, between the edge of the most recently triggered Hall sensor 3 and the time to switch to the next commutation step is based on the following two equations:
when PIOHP is less than AA:

$$TD=1.5*Thall*(AA-PIOHP)/FF;$$

when PIOHP is equal or greater than AA:

$$TD=1.5*Thall*[AA/2+FF-PIOHP]/FF;$$

where AA is equal to ⅔ of FF and FF is the maximum number which can be stored in a signed memory of a microprocessor. AA and FF are equal to $AA and $FF respectively for an 8 bit microprocessor. $AA is the hexadecimal representation of 170, and $FF is the hexadecimal representation of 255.

Figure 4:
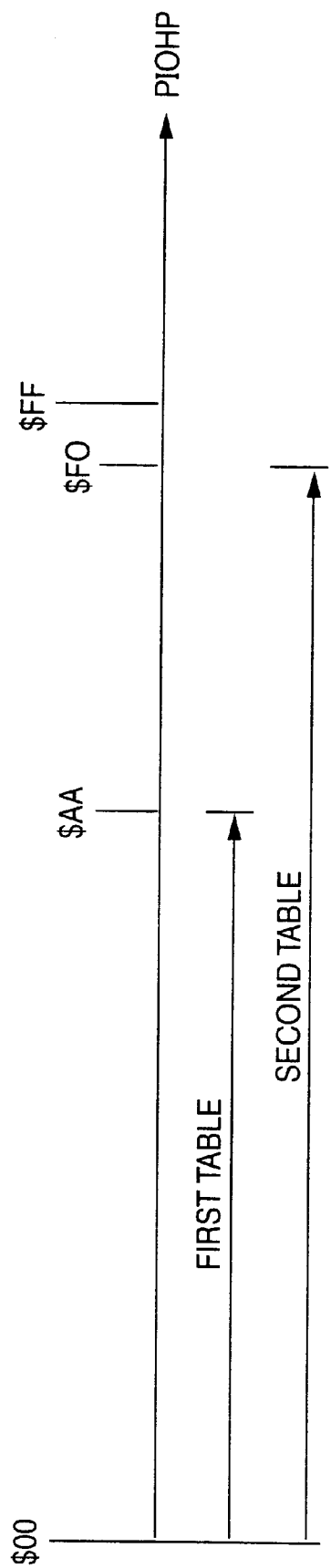
FIG. 4 is diagrammatic representation illustrating the relationship between the variable PIOHP put out by a PI regulator according to the invention and two truth tables according to the invention.

By properly adjusting the parameters Kp and $K_I$ of the PI speed regulator 14, i.e., proportional gain and integral gain, one achieves smooth speed regulation far above (e.g. 200–300% above, e.g. at least 100% above) the base speed. FIG. 4 schematically illustrates the relationship between variable PIOHP and the two jump tables. When PIOHP is less than $AA, the first above base jump table is used. The time delay TD controls the motor 2 speed. When PIOHP is equal or greater than $AA, control rotates to the second jump table. The new time delay (TD) value will still control the motor 2 speed. TD for the first table gives a substantially synchronous torque angle for about 0 to 60 degrees, while TD for the second table gives a substantially synchronous torque angle for about 60 to 85 degrees. Because 90 degrees is not a stable operating angle, one has to limit the maximum torque angle to less than about 85 degrees.

Also, in FIG. 4, "$00" is the hexadecimal representation of zero, and "$FO" is the hexadecimal representation of 240, which corresponds to an 85 degree torque angle.

In the above description, structures and steps that are described may be substituted for by other known or conventional structures or steps to obtain substantially the same desired result. Also, all quantifications given above should be understood to be approximate, and any and all lesser ranges within a broader range may be provided (e.g. for example the synchronous torque angle in the ranges of about 60–85 degrees may be for all other smaller ranges within that broad range, e.g. about 70–80 degrees). While the invention has been described with respect to an eight bit microprocessor, it should be understood that other microprocessors, or devices functionally equivalent to microprocessors, can be utilized. Thus, the invention is to be accorded the broadest interpretation of the appended claims to encompass all equivalent structures and methods.

What is claimed is:

1. A method of operating a permanent magnet brushless DC motor having a plurality of Hall sensors for commutation of the motor, a base speed, and an applicable commutation truth table, using at least one jump table based upon the applicable commutation truth table, said method comprising:

(a) up to base speed operation, effecting commutation of the motor using the applicable commutation truth table triggered by the Hall sensors, with pulse width modulation switching;

(b) above base speed operation, automatically determining a proper time delay between the edge of the most recently triggered Hall sensor and the time to switch to the next commutation step; and (c) automatically regulating motor speed above base speed, utilizing the time delay from (b), and without pulse width modulation switching, by using the at least one jump table.

2. A method as recited in claim 1 wherein (c) is practiced using a PI regulator, and adjusting the proportional gain and integral gain of the PI regulator.

3. A method as recited in claim 2 wherein the time delay determined in (b) is TD, and the PI regulator outputs a variable PIOHP, and the measured motor speed is Thall; and wherein (b) is practiced to determine TD pursuant to the following equations: when PIOHP is less than AA, TD=1.5*Thall*(AA−PIOHP)/FF; and when PIOHP is substantially equal to or greater than AA, TD=1.5*Thall*[AA/2+FF−PIOHP]/FF; and where AA and FF are $AA and $FF respectively for an 8 bit microprocessor.

4. A method as recited in claim 2 wherein the at least one jump table comprises first and second jump tables, the first jump table comprising the applicable commutation truth table forward rotated one step, and the second jump table comprising the applicable commutation truth table forward rotated two steps; and wherein the PI regulator outputs a variable PIOHP; and wherein c) is practiced by using the first jump table when PIOHP is less than AA, and the second jump table when PIOHP is substantially equal to or greater than AA.

5. A method as recited in claim 1 wherein the at least one jump table comprises first and second jump tables, the first jump table comprising the applicable commutation truth table forward rotated one step, and the second jump table comprising the applicable commutation truth table forward rotated two steps; and wherein (b) and (c) are practiced so that the time delay for the first jump table gives a substantially synchronous torque angle for about 0–60 degrees, and so that the time delay for the second jump table gives a substantially synchronous torque angle for about 60–85 degrees, and so that the maximum torque angle is limited to about 85 degrees.

6. A method as recited in claim 1 wherein (b) and (c) are practiced using an at least eight bit microprocessor, and wherein the tables are provided in software in the microprocessor.

7. A method as recited in claim 1 wherein (b) and (c) are practiced to regulate motor speed up to at least about 100% above base speed.

8. A controller assembly for a permanent magnet brushless DC motor having a plurality of phases, the controller assembly comprising:

a plurality of Hall sensors comprising commutation position sensors for the permanent magnet brushless DC motor;

a power amplifier comprising a plurality of power electronic switches connected to said motor, two power electronic switches connected to each phase of said motor;

an at least eight bit microprocessor connected to and controlling each of the power electronic switches;

a frequency to voltage converter;

said Hall sensors connected substantially directly to said microprocessor, and also connected to said frequency to voltage converter, which in turn is connected to said microprocessor; and wherein said microprocessor, in response to sensing by the Hall sensors both directly and through said frequency to voltage converter, controls said electronic switches to smoothly speed regulate said motor both below and above base speed.

9. A controller assembly as recited in claim 8 further comprising a current sensor connected to said microprocessor.

10. A controller assembly as recited in claim 9 wherein said microprocessor comprises a speed regulator and a torque regulator for below base speed operation, and a speed regulator and time delay for above base speed regulation.

11. A controller assembly as recited in claim 10 wherein said electronic switches associated with each phase comprise a top switch, and a bottom switch with pulse width modulation (PWM) below base speed; and wherein said microprocessor further comprises a commutation truth table for below speed operation which, for a three phase motor, comprises:

| Hall C | Hall B | Hall A | Gating |
|---|---|---|---|
| 0 | 0 | 1 | A top on and B bottom PWM |
| 0 | 1 | 0 | B top on and C bottom PWM |
| 0 | 1 | 1 | A top on and C bottom PWM |
| 1 | 0 | 0 | C top on and A bottom PWM |
| 1 | 0 | 1 | C top on and B bottom PWM |
| 1 | 1 | 0 | B top on and A bottom PWM |

12. A controller assembly as recited in claim 11 wherein said microprocessor further comprises, for substantially equal to and above base speed operation, first and second jump tables, said first jump table comprising said commutation truth table forward rotated one step, and said second jump table comprising said commutation truth table forward rotated two steps.

13. A controller assembly as recited in claim 12 wherein said first jump table controls the time delay to provide a substantially synchronous torque for about 0–60 degrees, and said second jump table controls the time delay to provide a substantially synchronous torque for about 60–85 degrees.

14. A controller assembly as recited in claim 10 wherein said microprocessor further comprises for substantially equal to and above base speed operation first and second jump tables; said first jump table, for a three phase motor, comprising:

| Hall C | Hall B | Hall A | Gating |
|---|---|---|---|
| 0 | 0 | 1 | A top on and C bottom on |
| 0 | 1 | 0 | B top on and A bottom on |
| 0 | 1 | 1 | B top on and C bottom on |
| 1 | 0 | 0 | C top on and B bottom on |
| 1 | 0 | 1 | A top on and B bottom on |
| 1 | 1 | 0 | C top on and A bottom on | and said second jump table, for a three phase motor, comprising:

| Hall C | Hall B | Hall A | Gating |
|---|---|---|---|
| 0 | 0 | 1 | B top on and C bottom on |
| 0 | 1 | 0 | C top on and A bottom on |
| 0 | 1 | 1 | B top on and A bottom on |
| 1 | 0 | 0 | A top on and B bottom on |
| 1 | 0 | 1 | A top on and C bottom on |
| 1 | 1 | 0 | C top on and B bottom on |

15. A controller assembly as recited in claim 8 wherein said electronic switches associated with each phase comprises a top switch, and a bottom switch with pulse width modulation (PWM) below base speed; and wherein said microprocessor further comprises a commutation truth table for below speed operation which, for a three phase motor, comprises:

| Hall C | Hall B | Hall A | Gating |
|---|---|---|---|
| 0 | 0 | 1 | A top on and B bottom PWM |
| 0 | 1 | 0 | B top on and C bottom PWM |
| 0 | 1 | 1 | A top on and C bottom PWM |
| 1 | 0 | 0 | C top on and A bottom PWM |
| 1 | 0 | 1 | C top on and B bottom PWM |
| 1 | 1 | 0 | B top on and A bottom PWM |

16. A controller assembly as recited in claim 15 wherein said microprocessor further comprises, for substantially equal to and above base speed operation first and second jump tables, said first jump table comprising said commutation truth table forward rotated one step, and said second jump table comprising said commutation truth table forward rotated two steps.

17. A controller assembly as recited in claim 8 wherein said motor comprises a three phase motor, and wherein said plurality of Hall sensors comprise three Hall sensors.

18. A method of controlling a permanent magnet brushless DC motor having a plurality of phases using a controller assembly comprising: a plurality of Hall sensors comprising commutation position sensors for the permanent magnet brushless DC motor; a power amplifier comprising a plurality of power electronic switches connected to the motor, two power electronic switches connected to each phase of the motor; an at least eight bit microprocessor connected to and controlling each of the power electronic switches; a frequency to voltage converter; and the Hall sensors connected substantially directly to the microprocessor, and also connected to the frequency to voltage converter, which in turn is connected to the microprocessor; said method comprising:

(a) in response to sensing by the Hall sensors both directly and through the frequency to voltage converter, using the microprocessor to control the electronic switches to smoothly speed regulate the motor both below and above base speed.

19. A method as recited in claim 18 wherein (a) is further practiced by sensing the current, and by when below base speed operating the microprocessor, using the sensed current, to control the torque of the motor.

20. A method as recited in claim 18 wherein the power electronic switches of the power amplifier comprise, for each motor phase, top and bottom switches; and wherein (a) is further practiced by when below base speed pulse width modulating the bottom switches of the power amplifier.

21. A method as recited in claim 20 wherein (a) is further practiced for below speed operation by the microprocessor using a commutation truth table which, for a three phase motor, comprises:

| Hall C | Hall B | Hall A | Gating |
|---|---|---|---|
| 0 | 0 | 1 | A top on and B bottom PWM |
| 0 | 1 | 0 | B top on and C bottom PWM |
| 0 | 1 | 1 | A top on and C bottom PWM |
| 1 | 0 | 0 | C top on and A bottom PWM |
| 1 | 0 | 1 | C top on and B bottom PWM |
| 1 | 1 | 0 | B top on and A bottom PWM |

22. A method as recited in claim 21 wherein (a) is further practiced for substantially equal to and above base speed operation by the microprocessor using first and second jump tables, the first jump table comprising the commutation truth table forward rotated one step, and the second jump table comprising the commutation truth table forward rotated two steps.

23. A method as recited in claim 18 wherein (a) is practiced to regulate the speed of the motor up to at least about 100% above base speed.

* * * * *